United States Patent [19]

Serge

[11] 4,323,772
[45] Apr. 6, 1982

[54] BAR CODE READER SYSTEM

[75] Inventor: Richard F. Serge, Lewisville, N.C.

[73] Assignee: R. J. Reynolds Tobacco Company, Winston Salem, N.C.

[21] Appl. No.: 127,674

[22] Filed: Mar. 6, 1980

[51] Int. Cl.³ ............................................. G06K 7/10
[52] U.S. Cl. .............................. 235/463; 340/146.3 Z
[58] Field of Search ............................... 235/463, 470; 340/146.3 Z, 146.3 H, 146.3 AQ

[56] References Cited

U.S. PATENT DOCUMENTS

| | | | |
|---|---|---|---|
| 4,044,227 | 8/1977 | Holm et al. | 235/463 |
| 4,135,633 | 1/1979 | Nojiri et al. | 235/463 |
| 4,136,821 | 1/1979 | Suglura et al. | 235/462 |
| 4,140,271 | 2/1979 | Nojiri et al. | 235/463 |
| 4,200,861 | 4/1980 | Hubach et al. | 340/146.3 AQ |
| 4,245,152 | 1/1981 | Flurry et al. | 340/146.3 Z |

OTHER PUBLICATIONS

D. H. Gasler–"Wraparound Elimination in Closely Packed Video Shift Registers", *IBM Technical Disclosure Bulletin*, vol. 15, No. 11, Apr. 1973, pp. 3433, 3434.

*Primary Examiner*—Donald J. Yusko
*Attorney, Agent, or Firm*—Jones, Tullar & Cooper

[57] ABSTRACT

A reader system for optically scanning a bar code and processing the resulting video signals to produce corresponding digital signals is disclosed. The scanner comprises a camera having an image sensor which converts the varying black and white bar code image into a corresponding analog video signal. This signal is fed to a dynamic threshold detector which tracks the midpoint voltage value of the video signal and applies this value to a comparator, where it is compared to the analog video signal. The output of the comparator provides a train of logic states "0" and "1" representing video levels below and above the midpoint voltage value, respectively, thus producing a digitalized video signal corresponding to the bar code. The digital signals are filtered to mask single bit aberrations, with the filter producing a series of logic "0"'s and "1"'s at the clock rate of the system, each of which represents the output of a single "pixel", or picture element, of the image sensor, the output level indicating whether the pixel has sensed a black or white bar.

The number of consecutive pixels having "0" or "1" output levels are counted and compared to preset values to determine whether wide or narrow code bars are being sensed, and this information is stored in digital form in one of two serial memories. At the same time, the total number of bars scanned is counted, and the memory is inhibited when the count equals the number of bars in the code.

At the completion of a first scan of the bar code image, the storage of informatiion is switched to the other serial memory and the bar code scanning process is repeated while the data just stored in the first memory is processed, for example, in a conventional bar code-to-numeric or alpha-numeric converter for display. Multiple scans of the bar code insure an accurate readout.

35 Claims, 24 Drawing Figures

BAR CODE READER SYSTEM

BACKGROUND OF THE INVENTION

The present invention relates, in general, to optical scanning systems and more particularly to an optical system for reading bar codes carried by moving packages such as cartons on a conveyor.

The use of optical bar codes for identifying a wide variety of goods is now well established, and such codes are commonly used for pricing, inventory control and for a variety of record keeping purposes in retail, wholesale and manufacturing operations. Such codes have proliferated with the increased use of automatic data processing systems, and this has produced a strong demand for reliable systems which will rapidly and accurately read the information provided by the codes, transfer that information to a computer, a data storage system, a read-out display, a control device, or the like. Extremely fast and accurate reading of these codes is particularly necessary if the advantages of computer control are to be realized, for although such codes may be read by a variety of available devices, or even by visual inspection, and the information then transferred to suitable data storage or handling equipment, prior art readers fail to take advantage of the high speed and accuracy of modern data processing equipment.

Numerous reading devices such as optical scanning cameras, laser systems and like optical devices, as well as a variety of mechanical systems have been developed for detecting bar codes and for providing corresponding electrical signals. Typical of the prior art systems are those shown and described in U.S. Pat. Nos. 4,135,663 to Nojiri et al., 4,136,821 to Sugiura et al., and 4,140,271 to Nojiri et al. Although such presently available bar code readers are sufficiently accurate to be commercially valuable, many problems are still encountered with them, and none has been found to be entirely satisfactory. For example, many prior devices are incapable of reading bar codes that are printed on background material that provides a poor contrast with the printing ink, where the printing has been done inaccurately or incompletely, where the printing ink has been smudged, or where dirt gets on the code label and provides false readings.

A particular problem is encountered where it is desired to detect codes printed on moving targets such as containers on a conveyor, for the motion of the code label compounds the problems described above. The reading of bar code labels on conveyor-carried containers or packages presents additional difficulties where the container can become mislocated on the conveyor so that the label is out of focus or at an angle with respect to the scanning camera. Thus, the container can be twisted or tilted on the conveyor so that the code markings are foreshortened with respect to the reader, thus making an accurate detection of the code extremely difficult and, with many prior art devices, substantially impossible. Because of such problems, it becomes necessary to limit the maximum speed at which a conveyor can be operated and still provide some assurance of a reasonable degree of reliability in reading the code markings, but such a limitation prevents the user of the equipment from realizing the benefits of high speed computerized data handling systems, and the optical reader becomes the limiting factor in the system. The recent introduction of laser scanners has solved some of these problems, since lasers can be utilized to illuminate and scan bar code labels at high speeds and with improved focus. But even so, even minor anomolies in the printed code on a container or label can cause serious errors in a read-out, and this, taken with the high initial expense and the high maintenance costs of laser devices, have made such systems unsatisfactory.

The various problems encountered in prior art systems as outlined above have been overcome by the present invention, which provides rapid and accurate reading of bar codes at lower cost and with greater reliability than was heretofore possible. The reader of the present invention is capable of providing multiple scans of a bar code as it passes by the reader at a high rate of speed, and the data handling system of the invention is capable of producing an accurate read-out of the coded information with a high degree of resolution and reliability.

SUMMARY OF THE INVENTION

Briefly, the reading system of the present invention utilizes a conventional line scan camera which optically scans a bar code having a plurality of narrow or wide code bars of alternate first and second contrasting optical characteristics. The coding of the bars is accomplished by means of the bar widths, and accordingly it is this information which must be accurately determined by the reader. In the usual form, bar codes are printed on a contrasting background so that both the inked image and the contrasting color spaces between the printed elements can be width coded. Although a variety of color combination can be used, for purposes of convenience the code bars will herein be considered to be black bars printed or otherwise formed on a white background.

The scanning camera is focused on the label to be read, and the image thereof is focused on an optical sensor. This sensor may be a charge coupled image sensor consisting of a single continuous row of photodiodes which respond to the light pattern impinging thereon to produce corresponding outputs. The photodiode outputs are scanned sequentially to provide a video output signal which is an analog signal representing the output levels of each of the photodiodes in sequence. The camera repeatedly scans the bar code as it is moved past the camera location to obtain a number of readouts to insure an accurate and reliable reading of the label. A threshold detector circuit responds to the peak excursions of the video output signal from the camera and produces a threshold voltage which tracks the midpoint value of the positive and negative excursions of the analog video signal. This threshold voltage is compared to the original video signal in a comparator which then provides a logic 1 output for a video level which exceeds the threshold level and a logic 0 output whenever the video level falls below the threshold voltage, these logic levels occuring during the scanning of white and black code bars respectively. This threshold detector thus insures the reliable detection of black and white code bars under varying ambient lighting conditions, compensates for variations in color contrast between the bar code and the package background, allows detection of faded colors or improperly inked bar codes, and overcomes the problems created by a wide variety of adverse conditions that have, in the past, prevented the accurate reading of bar codes.

The output of the comparator is applied to a digital filter which eliminates logic 1 or 0 signals which have a duration equal to that of the output from a single photodiode in the scan camera. This filter thus requires that at least two consecutive photodiodes, or picture elements (i.e., pixels) must be in the same state before that state is recognized, thereby masking any single pixel aberrations which may be found within the bar code, avoiding problems due to faulty photodiodes, and providing greater tolerance to out-of-focus conditions. The output of the filter is a series of logic 0's and 1's at the clock rate which represent the outputs of the line of pixels as sequentially scanned by the image sensor. Because of the large number of photodiodes in the camera, the outputs from a number of adjacent elements is required to indicate each black or white bar, with the exact number of pixels being dependent on whether a wide bar or a narrow bar is being scanned.

The number of black or white pixels required to represent wide and narrow bars will depend upon the exact bar code being used, as well as on the distance between the camera and the code label. To detect whether a wide or narrow bar is being scanned, the number of black or white consecutive pixels received from the filter is counted and compared to a preset value. If the series of pixels counted is below the preset value, a narrow bar is indicated, and a "0" is written into a first in-first out serial memory. If the count is greater than the present value, but less than twice the preset value, a "1" representing a wide bar is written into the memoray so that a series of logic 1's and 0's representing the widths of the alternating white and black code bars is stored. The memory receives one input digit for each bar, and since it is known how many bars make up a code, and that the bars are alternately black and white, the only additional information required for memory storage is the width of each bar. Thus, at the completion of a scan, the memory will contain a series of logic 1's and 0's, the value of each digit representing the width of a corresponding code bar, and its location in the train representing its color.

If the number of consecutive black or white pixels received from the filter is greater than twice the preset value, then the counters are cleared since such a reading indicates that the scanner video output does not contain valid bar width data.

As the serial memory is being filled with 1's and 0's representing bar widths, the number of bars scanned by the camera is counted and compared to a preset count representing the total number of bars contained on the label being scanned. A typical bar code may contain 35 code bars, and when the total bar count is reached, the serial memory is inhibited to prevent it from accepting further data or from being cleared.

At the completion of a first scan of the bar code, the entire scanning process is repeated, but the information from this second scan is fed to and stored in a second serial memory. During the second scan, the data previously accumulated in the first serial memory is transferred to a controller such as a microprocessor. At the end of the second scan, the system reverts to storing data in the first serial memory and the process is again repeated, with the data from the second memory being transferred to the microprocessor during the third scan. This repetitive scanning continues until the label moves out of the range of the scanning camera. The information from a plurality of scans is accumulated in the computer and is available for conversion to numeric or alphanumeric read-out values, whereby a display of the bar code value may be provided. Suitable error checking may also be provided to assure that the displayed bar code value is valid, and the accumulated data may be utilized in further processing for inventory control or the like, as required. Such further processing is not a part of the present invention but is conventional in the art and will not be described herein.

At the same time each of the serial memories is being filled with data, all white pixels and all black pixels are summed in separate counters so that the total number of white pixels and the total number of black pixels in a single scan is obtained. Each of these counts is divided by the total number of white or black bars scanned, respectively, and, since there normally is a defined relationship between the widths, in pixels, of the wide and narrow bars, an average width for narrow bars can be determined. In typical bar codes, for example, a wide bar might be twice as wide as a narrow bar. By counting the total number of white bars and the total number of white pixels and knowing the equivalent number of narrow bars represented by the total number of wide and narrow bars, simple division allows a determination of the average width of a narrow white bar. In similar manner the average width of a narrow black bar can be obtained from the total number of black pixels and the total number of black bars. The values so derived are used for the preset bar widths described above.

The code reading system of the present invention thus provides a method for optically detecting the varying black and white code bars, converting the optical signal to a corresponding analog video signal, digitalizing the signal by means of a threshold detector to provide positive and negative signals corresponding to the code bars, and filtering the digital signal to eliminate aberrations. The output of the filter is then compared to preset values representing the number of picture elements in a narrow white or black bar to produce a digital output comprising a train of pulses representing the width of each successive bar. The train of pulses from each video scan is stored in one or the other of a pair of serial memories, alternately, and the information already stored in the memory which is not receiving data is fed to a controller for suitable processing. In this way, the video signals representing bar codes are rapidly and accurately converted to corresponding digital signals suitable for further data handling, and repetitive scanning of the code and accumulation of the successive scan values insures an accurate reading of the bar code value.

BRIEF DESCRIPTION OF THE DRAWINGS

The foregoing and additional objects, features and advantages of the invention will become apparent to those of skill in the art from a consideration of the following detailed description thereof taken in conjunction with the accompanying drawings, in which:

FIGS. 4A-4P are graphical illustrations of the waveforms appearing at various parts of the diagram of FIGS. 3A-3C;

DESCRIPTION OF A PREFERRED EMBODIMENT

Figure 1:
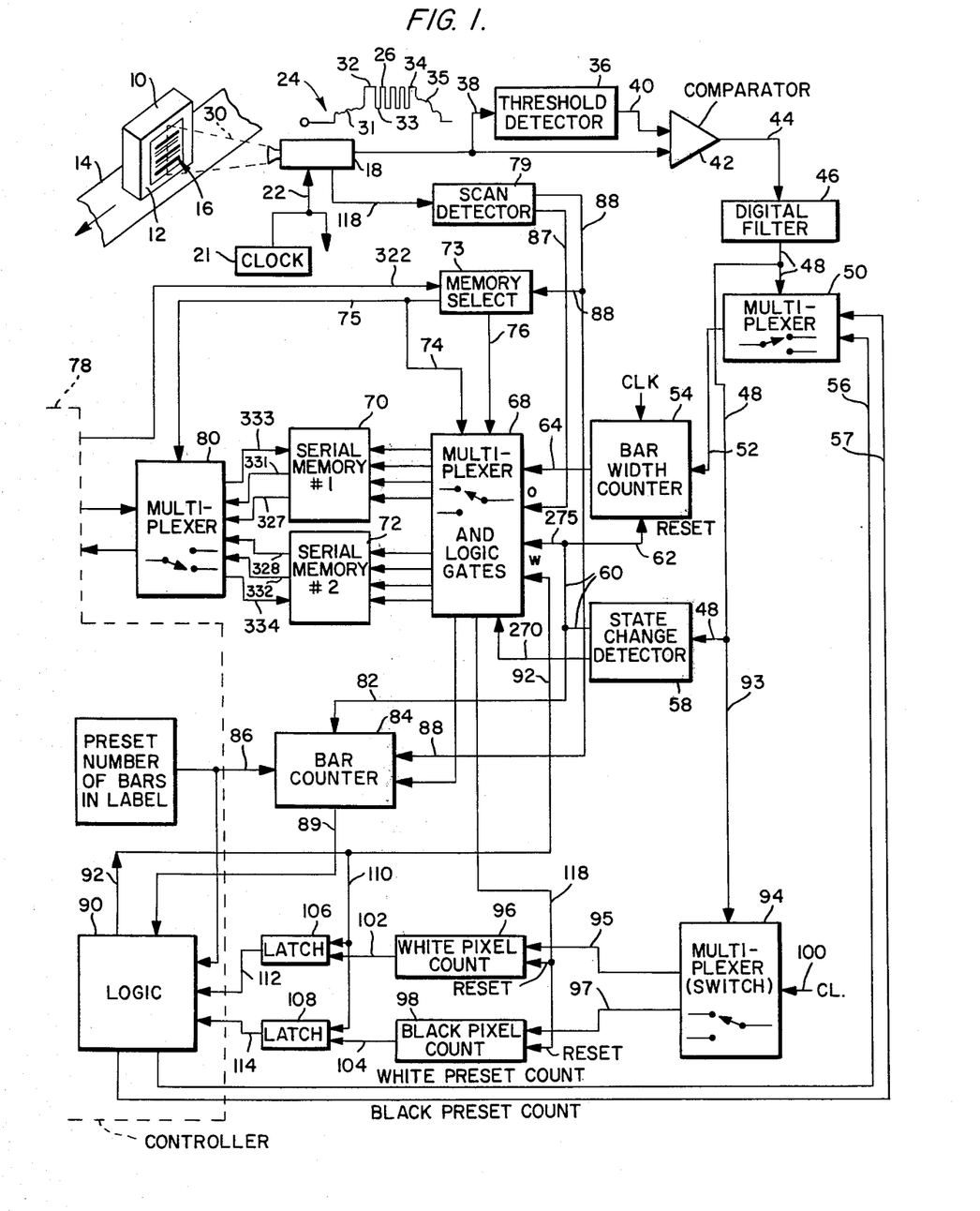
FIG. 1 is a functional block diagram of the system of the present invention.

Turning now to a more detailed consideration of the present invention, reference is first made to FIG. 1, which is a functional block diagram illustrating the overall operation of the present system. In the embodiment illustrated therein, packages or containers 10 on which are affixed labels 12 are carried by means of a conveyor 14 from one location to another. For example, the containers may be boxes containing cigarette cartons which are being delivered from a manufacturing facility to a loading platform. The label 12 carries a bar code 16 of conventional and well-known form, the bar code being a standardized representation of information relating to the particular container, which information is to be detected and displayed, stored, or otherwise utilized. As illustrated, the code comprises a plurality of alternating black and white bars of predetermined widths, the preferred code being the so-called interleaved 2 of 5 code, although the conventional UPC or other code may be used. The bar code may be printed on a separate label or directly on the container, and for purposes of the present invention preferrably is arranged on the package with the bars oriented horizontally to permit a vertical scan of the bar code as it passes the reading station.

Located at a reading station adjacent the conveyor is a suitable optical scanning camera 18 which, for example, may be, a commercially available Fairchild Line Scan Camera Model CCD1410. This camera utilizes ambient light, and thus does not require the use of a laser, and operates by focusing an optical image, in this case the bar code on container 10, onto a linear array of photodiodes, each of which responds to the portion of the image which impinges upon it to produce an output signal. The camera electronically scans the array of diodes to produce on line 20 an analog signal representing the outputs from each of the picture elements in sequence. A suitable clock source 21 drives the camera scan by way of clock input 22 so that the output of each photodiode appears on line 20 for the duration of a single clock count, thereby producing a wave form such as that generally indicated at 24.

Figures 2, 3B, 5, 6:
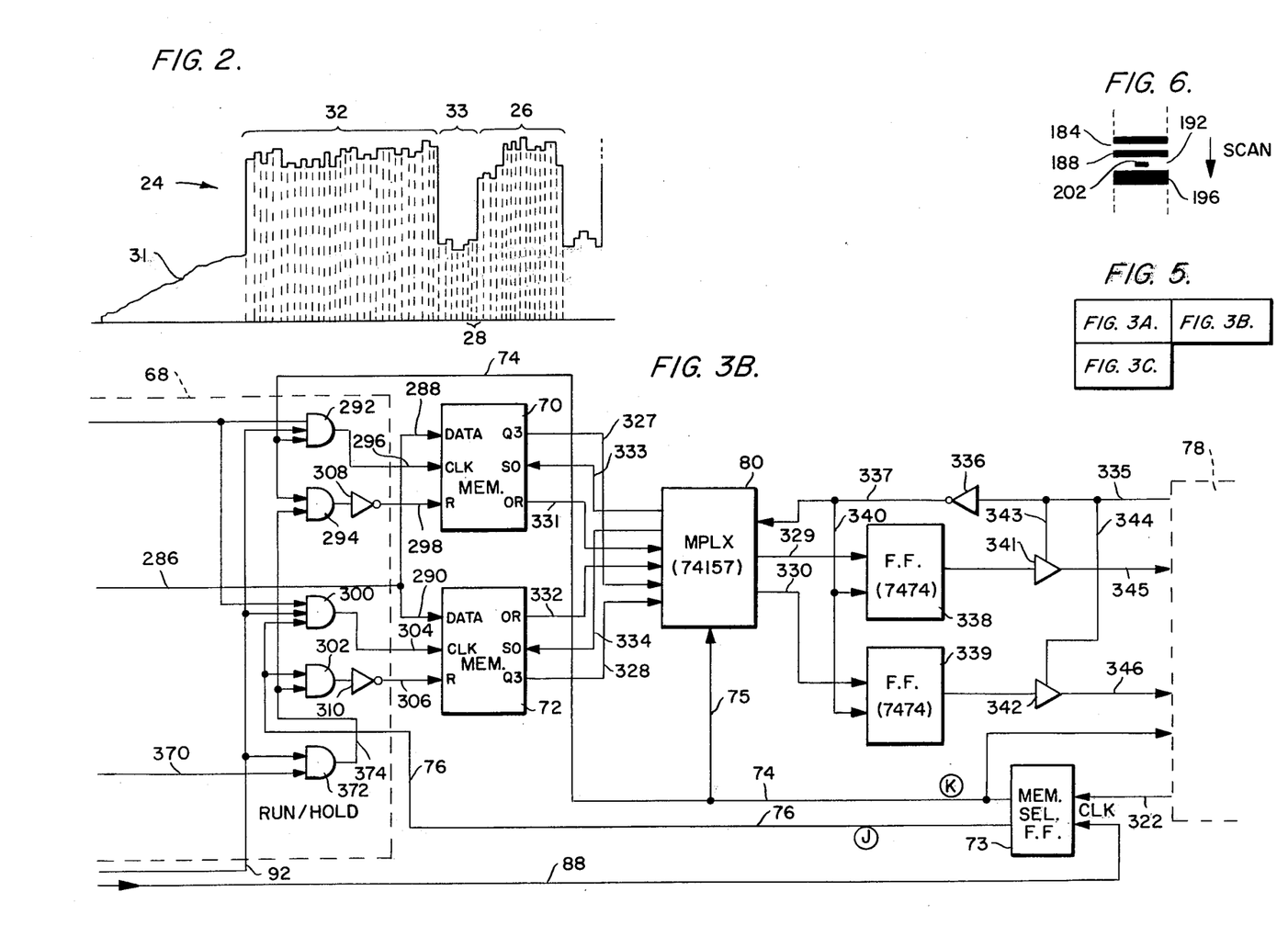
FIG. 2 is a graphical illustration of a portion of the waveform output from the scanning camera used in the invention.
FIGS. 3A-3C are a partially schematic diagram of the circuit of the present invention.
FIG. 5 illustrates the relationship of FIGS. 3A-3C.
FIG. 6 is a diagrammatic illustration of a portion of a bar code, illustrating an aberration therein.

An enlargement of a portion of wave form 24 is illustrated in FIG. 2, wherein it may be seen that a typical pulse 26 includes the sequential outputs from a plurality of picture elements, or pixels, each element being applied to the output line 20 for a clock time interval generally indicated at 28. The pulse 26, for purposes of illustration, represents the consecutive outputs of twelve pixels and thus may represent a wide white bar on the label 12. Since each pixel represents the output of a photodiode, the amplitude of wave 26 varies in accordance with the intensity of the light falling on the particular pixels, in accordance with the output characteristics of the particular photodiodes, and in accordance with other factors such as differences in color of the label material, imperfections in the printing of the bar code, fading of the ink, and the like. For example, if the black bars are not carefully printed, some of the ink might run into the white area and give a false reading of the widths of both bars. Furthermore, if one of the picture elements has burned out, a single count pulse might show up in the middle of another pulse, thereby producing an erroneous reading if not corrected.

The Fairchild Line Scan Camera described above includes a CCD121H line scan image sensor which incorporates 1,728 photodiode picture elements which are scanned sequentially to produce the wave form 24, the wave form thus representing a single vertical scan of the entire label 12, as indicated by the dotted scan line 30 in FIG. 1. In the present system, the camera is operated at a clock rate sufficiently high to permit multiple scans of the label as the container 10 passes by the readout station. In accordance with one embodiment of the invention, the camera was operated at a scan rate of 560 scans per second, which permitted consistent reading of labels at a conveyor speed of 475 feet per minute with code bars 0.25 inches in length. By increasing the scan rate, as many as six scans of a single label can be made at conveyor speeds of up to 2000 feet per minute, with the multiple scans insuring a reliable and accurate readout.

It will be noted that waveform 24 includes a lead-in portion 31 which represents the outputs of picture elements responsive to an image of the portion of the carton next to the edge of label 12. The initial pulse 32 represents a white margin portion of the label which is wider than the code bars, pulse 33 represents the pixel outputs from a narrow black bar, and pulse 26 represents a wide white bar, as discussed above. The succeeding pulses in waveform 24 represent additional black and white bars, and are followed by another margin 34 and a trailing portion 35 which represents the carton adjacent the opposite edge of the label. The waveform 24 thus represents the output from the camera in a single scan of the label and portions of the carton on either side of the label.

Although the amplitudes of pulses 26, 32, and 33 appear to be relatively constant, a closer inspection reveals variations in amplitude from one scan to the next, or within a signle scan as illustrated in FIG. 2. In order to accurately detect the differences between the white and black pulse amplitudes, a threshold detector 36 is provided which tracks the average level of the video output of camera 18, and thus tracks the midpoint of the excursions of waveform 24. This detector thus provides an instantaneous threshold signal which dynamically follows the midpoint of the changing video signal. This threshold value then being available for comparison with relatively positive pulses such as 32 and 26, and relatively negative pulses such as 33 to insure accurate detection of white and black code bars, even where the absolute difference in amplitude between the black and white pulses is not great. The structure and operation of the dynamic threshold detector 36 is described in greater detail in copending application Ser. No. 127,673, of Richard F. Serge and Danny D. Dugan, entitled "Dynamic Threshold Detector" and filed on even date herewith.

The video waveform on line 20 is applied to the threshold detector 36 by way of line 38, with the detector producing an output line 40 a dynamic threshold value which may be fed to a first input of comparator 42. The video signal on line 20 is supplied to the other input of the comparator, which then produces a digital output corresponding to the waveform 24. This digital output is comprised of a train of logical 0's and 1's corresponding to black and white bars, respectively, the 0's being produced when the video signal falls below the threshold value and the 1's being produced when the video signal exceeds the threshold. The length of each digital pulse corresponds to the number of clock pulses which represent the camera scanner diodes that are "looking at" the individual black or white code bar, and thus to the width of that bar.

The output of the comparator 42, which may be termed a binary video output, represents the bar code on label 12. This binary video output signal is applied by way of line 44 to a digital filter 46 which serves to eliminate waveform aberrations which are produced by failures in individual photodiode units, by printing imperfections in the bar code, or the like. These aberrations generally are represented by a single pixel variation which shows up as a pulse which is a single count in length, and digital filter 46 is provided to eliminate such variations. Since single pixel aberrations are typical, the present invention will be described in terms of a filter designed to mask such variations. However, it should be understood that multiple pixel variations can be masked using a filter similar to that illustrated at 46.

Single pixel filter 46, which will be described in detail hereinbelow, is essentially a four-bit shift register which receives the binary video signal and shifts it through to its output in four counts. However, the filter will only shift pulses through which are more than one count in width, and any single count pulses are cancelled. This function not only masks any single bit aberations found in the bar code, but also provides a system which is more tolerant of out-of-focus conditions, since two consecutive pixels must be in the same state before that state is recognized. Once a change in state is recognized, the filter retroactively effects the change at the first pixel which caused the new state.

The output of digital filter 46 is a series of logic 0's and 1's at the clock rate, but delayed by four counts, which represent black and white pixels scanned by the image sensor. This output is applied by way of line 48 to a first bar width multiplexer circuit 50 to shift the multiplexer each time the filter output changes from one logic state to the other, i.e., each time the camera scan moves from a white bar to a black bar or vice versa. The output from the multiplexer is fed by way of line 52 to a bar width counter 54 to set the counter to a predetermined count corresponding to the number of pixels in, and thus the width of, either a black or a white narrow bar, the preset counts being supplied to the multiplexer input by way of lines 56 and 57. The multiplexer selects one of the preset counts and supplies it to the bar width counter 54 which then counts down under control of the system clock in synchronism with the output from the digital filter.

The output from filter 46 is also supplied by way of line 48 to a state change detecting circuit 58 which is also responsive to changes on line 48 between the 0 and the 1 logic output levels. Each time a change of state is detected, an output is provided by circuit 58 by way of lines 60 and 62 to set the bar width counter to its preset value. The counter begins to count down toward zero, and if a change of state occurs before it has counted the preset value, a 0, representing a narrow bar, appears on counter output line 64 and is fed through a multiplexer and logic network 68 to a selected one of two serial memories 70 or 72. If the counter 54 reaches zero before the change of state occurs, it resets itself and begins to count down again. If the change of state occurs during this second shutdown, at a time that is less than twice the preset value, a logic 1, representing a wide bar, appears on line 64 and is fed by way of the multiplexer 68 to the selected serial memory. If the counter completes the second count before receiving the change of state signal, so that the width of the image being scanned is at least twice the width of a narrow bar, the signal is invalid and the counter is cleared. An invalid signal may occur, for example, when the camera scans the marginal "quiet zone" preceeding the bar code.

The serial memories 70 and 72 are of the first infirst out ("fifo") type and are selected by the multiplexer/logic circuit 68 in response to memory select signals supplied by a select circuit 73 by way of lines 74, 75 and 76 under the control of a suitable controller 78. This controller, which may be a conventional microprocessor such as the Motorola M6809, activates the memory select circuit 73 to produce a logic output which operates to select a first one of the serial memories during a first scan and to select the second memory during a second scan of the label, the multiplexer shifting alternately between the two memories for each sequential scan. This selection may be made in response to a scan detector 79, to be described, which responds to each scan interval of the camera 18 to provide a signal which indicates the end of a scan.

Each of the serial memories 70 and 72 is connected through a third data output multiplexer 80 to the controller 78, multiplexer 80 being controlled by the memory select signal on lines 74, 75 to alternately connect the serial memories to the controller. When one memory is being supplied with data through multiplexer 68, the other serial memory is connected through multiplexer 80 to the controller for storage of data from that memory and subsequent processing, to be described.

At the same time that the bar width information is being supplied to the serial memories under control of the output of the state change detector 58, the output from that detector is also being supplied by way of lines 60 and 82 to a bar counter network 84 which counts the number of consecutive bars scanned by camera 18, as represented by the change of state pulses. A controller-supplied count of the number of bars contained on the label being scanned is fed to counter 84 by way of line 86, and the counter is set to that number by an input from scan detector 79 by way of line 88. Upon being set, the counter 84 counts down one step each time it receives a change of state pulse, and when it reaches zero the bar counter produces an output on line 89 which feeds that information by way of suitable logic circuitry 90, line 92 and multiplexer/logic circuit 68 to the memories 70 and 72. This inhibits the memories and prevents them from accepting any additional data or from being cleared so that any information then in the selected memory is stored for subsequent read-out.

During each scan, the output from the digital filter 46 is also applied by way of lines 48 and 93 to drive a fourth multiplexer circuit 94. The outputs of multiplexer 94 are connected by way of line 95 to a white pixel counter 96 and by way of line 97 to a black pixel counter 98. The multiplexer receives clock pulses from clock source 21 by way of input line 100 and feeds them to either the white pixel counter 96 or the black pixel counter 98, depending on whether a logic 1 or a logic 0 is present on line 93, respectively. Thus, counter 96 accumulates a count equal to the total number of white pixels in a label scan while the counter 98 accumulates the total number of black pixels in a scan. Upon completion of the scan of the code bars, the bar counter output on lines 89 and 92 causes the accumulated count in each of counters 96 and 98 to be fed by way of lines 102 and 104, respectively, to a corresponding pair of latching networks 106 and 108, and the counters are cleared. The content of the latches is then supplied to the logic circuit 90 by way of lines 112 and 114. The logic network 90 divides the respective white and black pixel counts by the total number of white or black bars scanned so that average white and black narrow bar widths are determined. These values are then supplied by way of lines 56 and 57 to the multiplexer 50 to provide the preset values for bar width, as described hereinabove. The pixel counters 96 and 98 are reset to zero at the end of each scan interval by means of an end of scan pulse from scan detector 79 by way of line 87, multiplexer/logic circuit 68, and line 118.

It will be understood that the foregoing processing occurs for each sweep of a label, and that the digital information stored in the serial memories 70 and 72 and alternately supplied to the controller 78 is accumulated in suitable storage circuits and is then used to provide an alphanumeric read-out where desired and to provide information for use in inventory control and the like in a manner that is well known in the art. The specific uses to which the digital representation of the bar code data is put is a matter of choice and is not a part of the present invention.

Figure 3A:
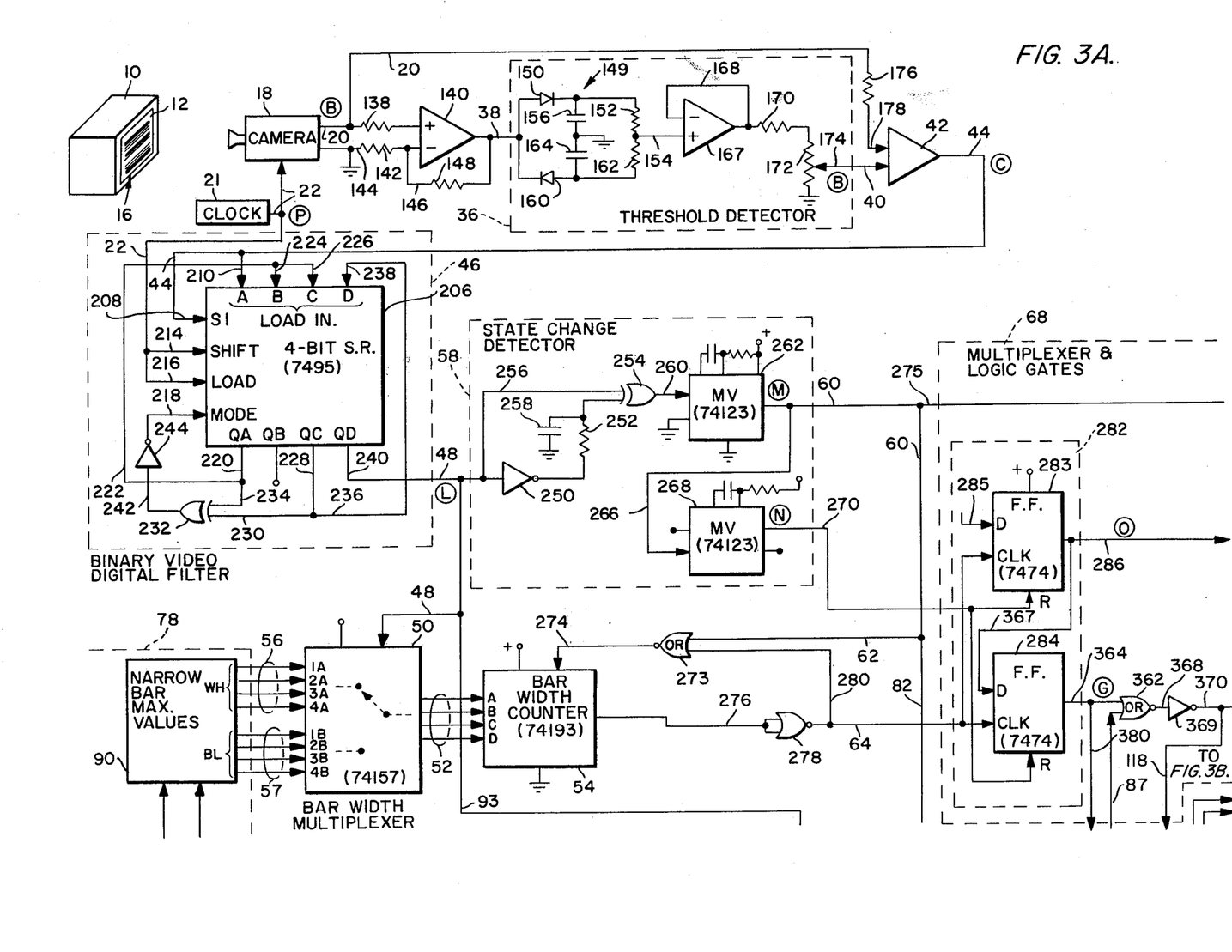
Figure 3C:
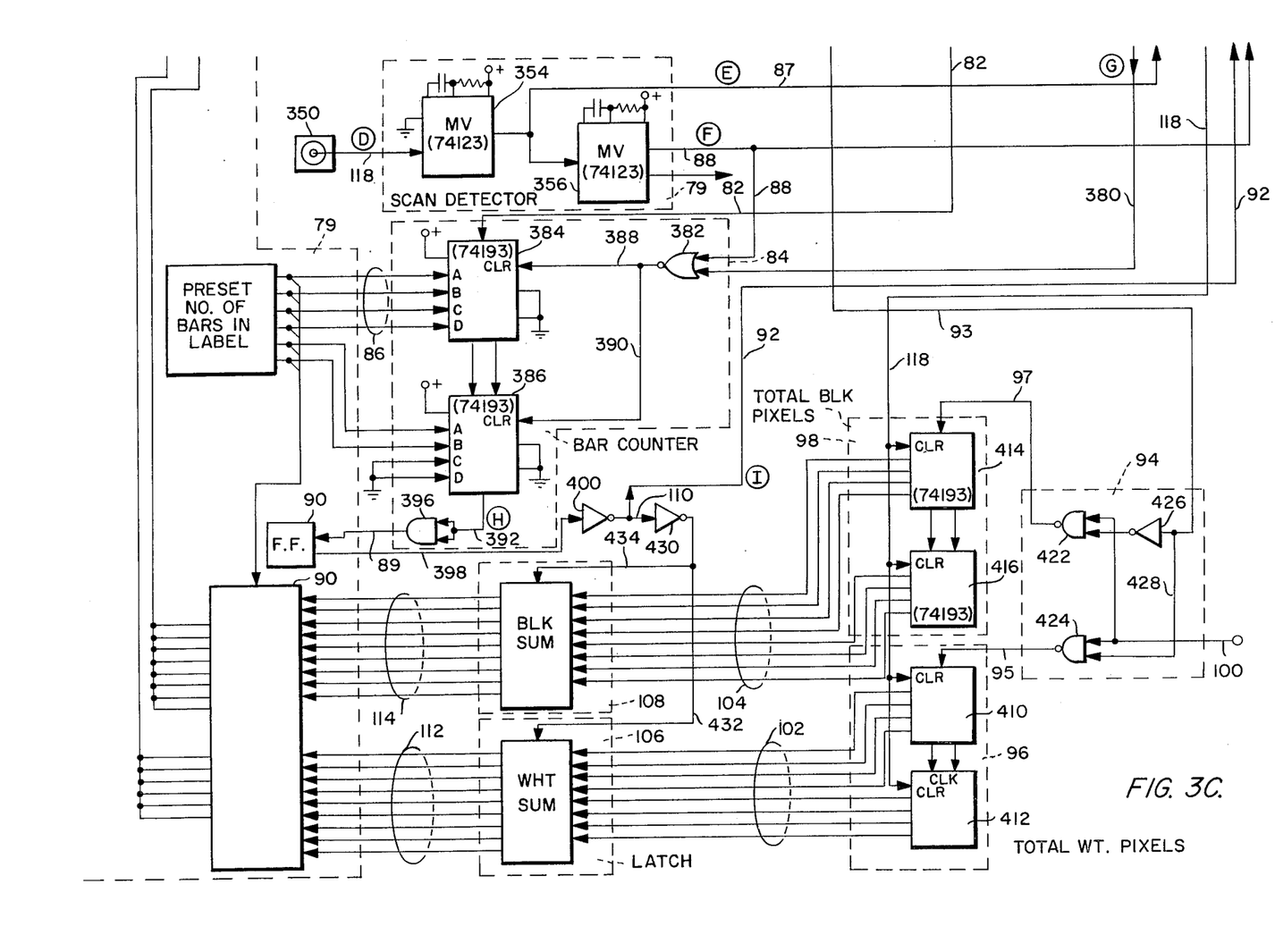
Figure 4A:
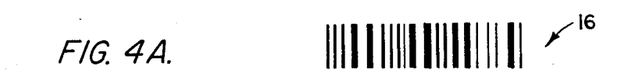
Figure 4B:
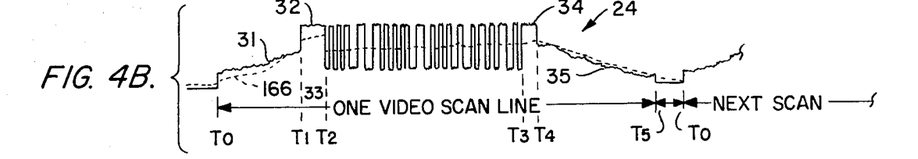
Figure 4C:
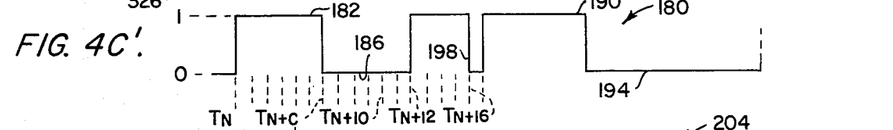
Figures 4C, 4D, 4E:
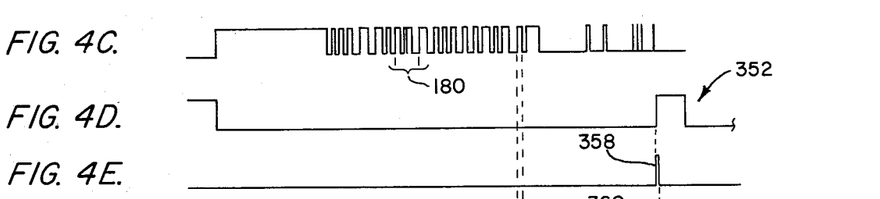
Figures 4F, 4G:
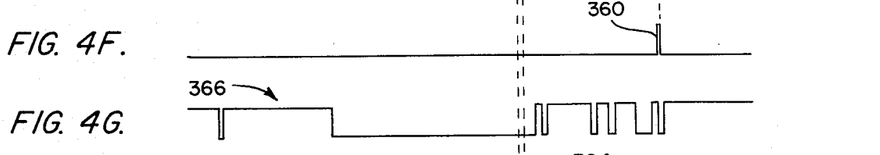
Figures 4H, 4I:
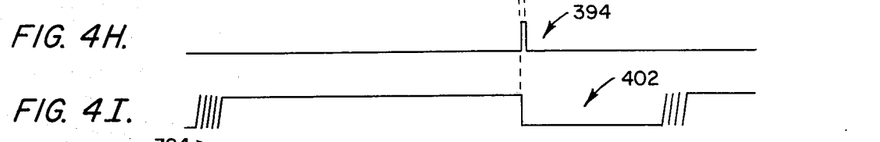
Figures 4J, 4K:
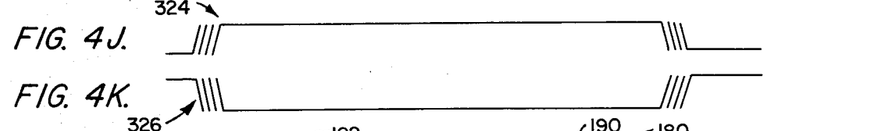
Figures 4L, 4M:
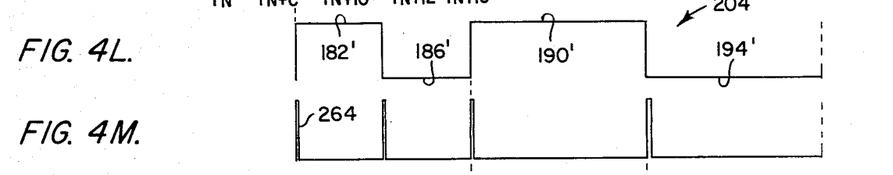
Figure 4N:
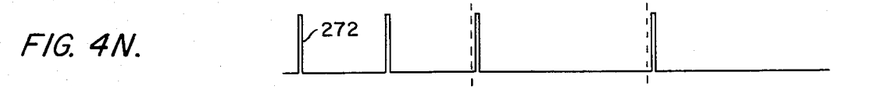
Figures 4O, 4P:
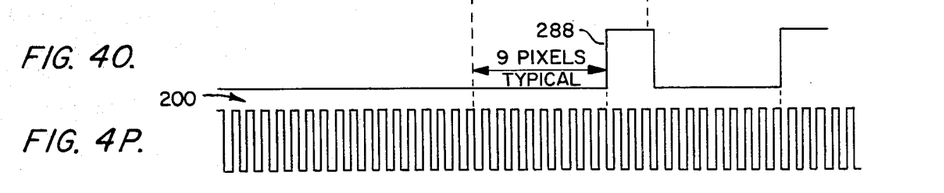

A more detailed illustration of the invention is found in FIGS. 3A, 3B and 3C and the wave forms of FIGS. 4A thru 4P, to which reference is now made, and wherein elements common to FIGS. 1 and 2 are similarly numbered. It should be understood that the detailed circuitry of FIG. 3 is exemplary of one form of the invention, and represents the best mode presently known for carrying out the present invention.

In FIG. 3A, the container 10 is again shown as carrying a label 12 having a bar code 16, an example of which is illustrated in greater detail in FIG. 4A. This bar code is of the interleaved 2 of 5 type which is preferred for the present system, although other standard codes can be read with the use of suitable conversion circuitry.

The bar code is, in the embodiment herein illustrated, arranged on the container so that the bars extend horizontally, the camera 18 scanning the bars in a vertical direction to obtain the desired read-out. The output from the camera appears as an analog video signal on line 20, with the wave form for a single scan of the camera being illustrated by the solid line of FIG. 4B. Since the scan angle which the camera is capable of covering may be larger than the label 12, the initial part of the video output represents the light reflected by the container 10 prior to reaching the label. This portion of the scan is illustrated at 31 in FIG. 4B, and occurs during the time $T_0-T_1$ of the scan interval. When the scan reaches the label itself, the margin area, which is the same color as the white bars or the background material for the label, appears as the pulse 32 during time $T_1-T_2$, with the first black bar producing the negative going pulse 33. As illustrated in FIG. 4B, the bar code produces during the time period $T_2-T_3$ alternately positive and negative going pulses which correspond to the white and black bars, thereby producing the analog wave form 24 which represents the code. At the end of the code there is another label margin portion 34, during time period $T_3-T_4$, followed by the portion 35 during time $T_4-T_5$ representing the read-out from the carton itself, which continues until the end of the scan at $T_5$. In a preferred form of the invention, a single video scan involves reading out in sequence each of 1,728 picture elements in the camera, with the individual pixel outputs being represented by the wave form 24 of FIG. 4B.

The output signal on line 20 is fed through resistor 138 to the positive input of a video amplifier 140, the negative input of which is connected through resistor 142 and line 144 to a ground point. The output of the amplifier is fed back to the negative input by way of line 146 and negative feedback resistor 148, and is also fed by way of line 38 to dynamic threshold detector 36. The detector tracks the midpoint value of the analog signal on line 38 to produce a voltage signal which represents the average background signal due to noise, ambient light, and the like. Such background signals are often sufficiently high to mask desired data signals, and accordingly it is necessary to distinguish this background from the modulating signals representing the data to be read. In the present case, the detector 36 tracks the D.C. signal that results from the background noise, and when the data signals due to the label bar code are reached, continues to provide an average value based on the changing amplitude data pulses. This average value may then be used as the base line for comparison with the video output from the camera, the outputs from black pixels being negative with respect to the average value and the outputs from white pixels being positive, so that a train of positive and negative pulses is obtained corresponding to the bar code pattern. These pulses can be obtained accurately and reliably even under conditions where prior devices would not work properly, as where the amplitudes of the analog signals vary within a single scan or from scan to scan, where the color contrast is low, where the camera is slightly out of focus, and like conditions.

Although threshold detectors have been suggested for optical readers, such prior systems typically have taken an average of the entire signal over a complete scan, the average being derived from the prior scan rather than the current scan. Such systems often produce an average value below the value of the signals being detected, particularly where the signals of interest are of low amplitude because of reduced lighting conditions or low bar contrast, for example. When this occurs, the variations in the signal of interest are insufficient to produce an output from the comparator, and an invalid reading is obtained. In the present system, however, the threshold detector dynamically tracks the average value of the signal currently being tracked, so that the foregoing problems are avoided.

The threshold detector 36 includes a peak detector and splitter network 149 which includes a forward-connected diode 150 connecting line 38 through resistor 152 to the peak detector network output line 154. The junction between diode 150 and resistor 152 is connected through a capacitor 156 to ground. Similarly, the signal on line 38 is connected by way of a reverse-connected diode 160 and a resistor 162 to the output line 154, with the junction between the diode 160 and resistor 162 being connected through a second capacitor 164 to ground. In this circuit, positive going video pulses such as pulse 26 are fed through diode 150 and across capacitor 156, charging the capacitor toward the peak value of the pulse, while negative going pulses such as 33 pass through diode 160 and across capacitor 164 to charge that capacitor toward the negative value. The voltages across the two capacitors are then averaged across resistors 152 and 162 so that the net voltage on line 154 represents the average value of the positive and negative pulses 26 and 33, illustrated by wave form 166 in FIG. 4B. This value changes slightly during the course of each pulse, as indicated by the variations of line 166, and in this way the threshold value is maintained continuously and accurately at the midpoint value for the signal 24 throughout the time period $T_0$ to $T_5$.

The output signal on line 154 is applied to the positive input of a buffer amplifier 167 having a negative feedback loop 168, the buffer having an amplification factor of 1. The threshold signal from amplifier 167 is applied by way of resistor 170 to an attentuator 172 which may be a potentiometer and which divides the signal by a factor equal to the multiplication factor of amplifier 140 to restore it to the range of values of the video signal on line 20. This threshold voltage is then applied by way of the potentiometer slide arm 174 and line 40 to one input of comparator 42.

The second input to comparator 42 is the video signal 24 which is fed by way of line 20 through resistor 176 to the second input 178 of the comparator. This comparator then compares the two signals on a continuous basis to provide a binary 1 output whenever the level of the video input signal on line 178 exceeds the threshold level on line 40, and provides a binary 0 signal whenever the input on line 178 falls below the value provided on line 40. Thus, the signal appearing on line 44 is the binary video signal illustrated in FIG. 4C and is a binary representation of the bar code.

The binary video signal on line 44 is applied to the binary video digital filter 46 (FIG. 3A), which may be best explained in conjunction with the enlarged portion 189 of waveform 24 which is illustrated in FIG. 4C'. This portion of the waveform corresponds to a segment of the bar code illustrated in FIG. 6, and includes a positive pulse 182 corresponding to a narrow white bar 184 followed by a negative pulse 186 corresponding to a narrow black bar 188. Pulse 186 is followed by a positive pulse 190 which represents a wide white bar 192 and a negative pulse 194 which represents a wide black bar 196.

Interrupting the pulse 190 is a very narrow negative pulse 198 which represents the output of a single picture element. Pulse 198 is equal in duration to a single clock pulse, the system clock being represented by the waveform 200 illustrated in FIG. 4P. This single pixel is much narrower than the narrowest code bar to be detected, which typically will be 6 pixels, and thus represents an aberration in the camera output. Such an aberration may be caused by a spot or mark on the bar code such as the dark spot 202 illustrated in FIG. 6, but it should be understood that similar single pixel aberrations may be due to a variety of causes and may appear in either the white or the black video data pulses.

The purpose of the binary video filter 46 is to eliminate black or white video states having a duration of only one clock cycle such as the pulse 198 and to produce at its output line 48 a series of logic 0's and 1's at the clock rate, but delayed by four counts, which represent plural black and white pixels as scanned by the image sensor. Such a filtered signal is illustrated in FIG. 4L by the wave form 204. The binary filter includes a four-bit shift register 206 which may, for example, be a conventional 7495 integrated circuit. The unfiltered binary video signal on line 44 is fed to the series input terminal 208 of the shift register and by way of line 210 to load input A, which is one of four parallel inputs A, B, C and D. The system clock 21, which produces the wave form illustrated in FIG. 4P, supplies clock pulses by way of line 22 to the shift and load input terminals 214 and 216, respectively, of the register 206. The clock pulses operate to sequentially shift the signals on the serial input line 208, or on the load input lines A, B, C or D, to the parallel output lines QA, QB, QC and QD, the particular signals being shifted depending on the mode of register 206. The register may be shifted between its serial and parallel modes by means of siganls applied to the mode input terminal 218.

Register output QA is connected by way of output terminal 220 and line 222 to the load input terminals 224 and 226 leading to load inputs B and C. This connection insures that whenever the register is in its parallel mode, any output appearing on output QA is shifted into the input stages B and C. Output QB is unconnected, while output QC is connected by way of terminal 228 and line 230 to one input of an exclusive OR gate 232, the other input of which is supplied from terminal 220 of the output QA by way of line 234. Output QC is also connected by way of terminal 228 and line 236 to load input D by way of terminal 238. Out QD provides on terminal 240 the filtered binary video signal 204 (FIG. 4L) which is supplied to line 48.

The output of gate 232 is connected by way of line 242 thru inverter 244 to the mode shift terminal 218. Whenever output QA is the same as output QC, gate 232 goes to zero and the inverter 244 output goes to 1 to provide a signal to the mode input terminal 218 to shift the register to the parallel mode. When the outputs on QA and QC are different the output of gate 232 goes to 1, the output of inverter 244 goes to 0, and the register remains in the serial input mode.

The operation of the filter 46 may be explained with reference to waveforms 180 and 204 in FIGS. 4C' and 4L, assuming that at time $T_N$ the positive going pulse 182 is applied by way of line 144 to the shift register 206. It is assumed that prior to time $T_N$ the register has been loaded with a binary 0 so that all of the outputs QA thru QD carry 0's. Because QA and QC are the same, the mode input terminal 218 is activated and the register is loaded in parallel from the inputs A, B, C and D, and the output line 48 carries a 0. At time $T_N$, a binary 1 (the first pixel of pulse 182) is applied to the register and is fed by way of terminals 208 and 210 to the serial input SI and to the load input A, thereby shifting the output on QA to a 1, generating 1 at the output of gate 232, and allowing the register to return to the serial input mode. At the occurrence of the next clock pulse, which occurs at time $T_N+1$, the 1 signal on QA is shifted to QB and a 1 is supplied from the input SI to terminal QA so that a 1 now appears on output terminals QA and QB, while 0 outputs remain on QC and QD. At time $T_N+3$, another 1 input is applied to terminal 208, shifting the output so that 1's now appear at output terminals QA, QB and QC. Terminal QD remains at 0. With QA and QC now both carrying 1's, the output of OR gate 232 shifts to 0 and the register 206 is shifted to the parallel mode, whereby the output signal on QA is fed by way of line 222 to the parallel inputs B and C to insure that QA, QB and QC are all the same. Since QB and QC already were the same as QA, this effects no change in the register. The output on QC is fed by way of line 236 to input D at terminal 238 so that upon the next shift of the register, output QD will go to 1. At time $T_N+3$, then, another 1 is applied to the shift register input and all of the outputs QA and QD carry 1's. The 1 now appearing at QD appears as the leading edge of pulse 182' on line 48, and is delayed by four counts.

At time $T_N+6$, the process repeats itself, with the outputs of the shift register sequentially returning to 0 until at time $T_N+10$ pulse 182' goes to 0 on line 48.

At time $T_N+12$, a 1 is applied to the input of the shift register by way of line 44 and the process again repeats itself until at time $T_N+16$ the outputs QA thru QD all carry 1's, and pulse 190' appears on output line 48. However, pulse $T_N+16$ is a 0, representing an aberration in the bar code and the application of this 0 causes a 0 to appear on output QA, thereby generating a 1 at the output of gate 232 and shifting the register back to the serial mode. At time $T_N+17$, the input pulse shifts back to a 1, and the 0 is shifted to output QB. At this time, outputs QA and QC are both 1+s, and the gate 232 is reactivated to shift the register to the parallel mode. This causes the signal on output QA to be fed by way of line 222 to the load inputs B and C. Since the register is in the parallel mode, this forces output QB to change to a 1. At time $T_N+18$, another 1 is inserted into the register, the 1 now appearing at the output QB is shifted to QC, and the system continues as before. However, the aberration represented by pulse 198 has now been eliminated, since it was only one pixel in duration and, as may be seen in waveform 190', that aberration never reaches the output terminal 240 of the register, and thus never appears on line 48. In this way, the filter eliminates pulses that are only a single pixel wide and requires information signals to be at least two pixels wide if they are to pass through the filter. This serves to eliminate a large number of false readings, and increases the reliability of the system.

Although the operation of filter 46 has been described for a single pixel aberration, it will be understood that such filters may be provided for aberrations greater than one pixel in width. In such cases, the shift register 206 will be of greater capacity, with the exact length of the register depending upon the number of pixels to be masked, but following the technique outlined above. Such multiple pixel filters may be required in high noise applications, but for most purposes a single pixel filter as described provides reliable operation of the system.

The output signal on line 48 from the binary video filter is a series of logic 0's and 1's at the clock rate, but delayed by four counts, which represent black and white pixels as scanned by the image sensor, and as illustrated by waveform 204. This wave is applied by way of line 48 through a resistor 252 to one input of an exclusive OR gate 254, and by way of line 256 to the other input of gate 254. A capacitor 258 is connected to the junction between resistor 252 and gate 254. This circuit responds to each change of state in waveform 204 (i.e., from a 1 to a 0 logic state, or vice versa) to produce an output pulse on line 260 which is applied to the input of a one-shot multivibrator 262. This pulse activates the one-shot to produce a single output spike 264 on line 60, this output being illustrated in FIG. 4M. Thus, the output of one-shot multivibrator 262 is a series of spikes 264 on line 60, each spike coinciding with a change in the logic state of the signal on line 48.

The output signal from one-shot 262 is applied by way of line 266 to the input of a second one-shot multivibrator 268 to activate that circuit to produce on its output line 270 a string of output pulses 272, illustrated in FIG. 4N. Again, the pulses 272 are produced at the end of each of the positive and negative going pulses in waveform 204. The train of pulses 264 which appears on line 60 is supplied to the bar width counter 54 by way of line 62, OR gate 273, and line 274, is supplied to the multiplexer and logic gates 68 by way of line 275, and is supplied to the bar counter 84 by way of line 82. The train of pulses 272 which appears on line 270 is applied to logic networks to be described within the multiplexer logic circuit 68.

The pulse train on line 60 which is applied to the bar width counter 54 serves to reset that counter at the end of each of the 0 and 1 pulses of waveform 204 to provide a count in pixels or in clock pulses of the width of each pulse and thus the width of the corresponding code bar being scanned. The bar width counter output on line 64 is applied to the multiplexer and logic gate circuit 68 to provide a data pulse to the serial memories 70 and 72 to store bar width information. The same signal from line 60 is also applied to the bar counter 84 by way of line 82 to cause that circuit to count the number of code bars read in each scan so that the serial memories are disabled when the total number of bars on the label has been read.

The bar width counter 54 receives at the beginning of each scan a preset count equal to the maximum number of pixels which will represent a narrow bar for the particular label and camera location. This information is provided through the multiplexer 50 which alternately supplies the required count for white bars and black bars and is switched from one to the other by the waveform 204 appearing on line 48. A positive pulse, such as the pulse 182', switches the multiplexer to the predetermined count set on its inputs 1A through 4A by way of line 56, which count represents the width of a narrow white bar, while negative pulses, such as pulse 186', switch the multiplexer to the values supplied to input terminals 1B through 4B by way of line 58. These counts are transferred to the bar width counter 54 when it is reset by pulses 264, and the counter is then stepped down by the system clock. It will be understood that the values supplied to the multiplexer 50 by way of lines 56 and 58 are preset by the controller 78 and are established before commencing label reading operations.

The narrow bar counts supplied to the bar width counter are a function of the particular label being used and the distance between the scanning camera and the label being read. The count values are generally established in the system design, when the label size and camera location are known. Even when these parameters are known, however, there will be variations which can affect the bar count value. For example, if the camera is located closer to the label, or further away, than the design value, the number of pixels representing a code bar will vary from the predetermined value. To accommodate this, the controller 78 provides an initial count which will be a "good guess" for camera locations within a range of, for example, two to four feet. This "good guess" value is used as the count for the first label, and the system then corrects itself by means of the pixel counters 96 and 98 to provide accurate maximum narrow bar counts, as will be described.

Additional flexibility may be provided in the system by providing means (not shown) for enabling an operator to provide an initial "good guess" value based on inspection of the particular label and camera configuration. Such an arrangement would also make use of the pixel counters and associated circuiting to correct the initial guess and to provide accurate count values.

When the appropriate count is supplied to the bar width counter 54 by the multiplexer 50, a pulse from the state change detector 58 is applied by way of line 274 to reset the counter 54, which then starts counting down under the control of the system clock. When the counter reaches 0, a pulse appears on counter output line 276, and this signal is fed through an inverter 278 to produce a logic 0 pulse on line 64. This logic 0 is applied to the second input of OR gate 273 to reset the bar width counter so that it will start counting down again, and is also applied to the clock inputs of a two stage shift register 282, which is part of the multiplexer and logic gate circuit 68 and which incorporates a pair of flip-flops 283 and 284. The shift register has a logic 1 signal applied to the data terminal 285 of flip-flop 283 so that when it is clocked by the pulse on line 64 the output on line 286 goes to 1. Since the pulse on line 64 only occurs after the bar width counter 54 has reached 0, the presence of such a pulse indicates that the predetermined maximum pixel value for a narrow bar has been exceeded and that, therefore, the bar being scanned is a wide bar. Thus, the appearance of a logic 1 on line 286, illustrated by pulse 288 in FIG. 4O, is indicative of a wide bar. As may be seen in FIG. 4O, the pulse 288 occurs whenever a wide bar is sensed, without regard to whether it is a white or a black bar.

If the code bar being sensed is narrow, the state change detector 58 produces an output on line 60 which resets the bar width counter 54 before it reaches 0, thus preventing a pulse from reaching line 64, and output line 286 from the two stage shift register remains at 0. It will be noted that the state change detector 58 also produces an output on line 270 which resets the shift register 282 each time the binary video signal shifts from one logic state to the other, thereby returning the output signal on line 286 to 0 at the end of each binary video pulse.

The data pulses 288 are supplied by way of line 286 to the data input terminals 288 and 290 of serial memories 70 and 72 (FIGS. 3B), respectively. These memories store the received data in a serial manner for later transfer to suitable data processing circuitry. Control of the memories is effected by a logic circuit which includes first and second AND gates 292 and 294 connected to the clock and reset terminals 296 and 298, respectively, of memory 70, and AND gates 300 and 302 which are connected to the clock and reset terminals 304 and 306, respectively, of memory 72. The output from AND gate 294 is connected to terminal 298 through an inverter 308, while AND gate 302 is connected to terminal 306 through an inverter 310.

As previously indicated, data is supplied to only one of the memories 70 and 72 at a time, during which time the data already stored in the other memory is transferred out. Selection of the memory circuits for storage of data is accomplished by means of a memory select flip-flop circuit 73 which is provided with a data input from controller 78 by way of input terminal 322 and which is driven by end of scan pulses on line 88 to produce an output on line 76 which alternates between a logic 1 and a logic 0 for each scan of the camera 18. The output on line 76 is illustrated in FIG. 4J by waveform 324 which is at logic 1 for the first scan, and then shifts to logic 0 for the next following scan.

The flip-flop 73 produces a second output on line 74 which is illustrated by waveform 326 in FIG. 4K. As shown, the signal on line 74 is of opposite polarity to the signal on line 76, with the polarities being shifted by the periodic inputs on line 322 from controller 78. The waveform 326 on line 74 is applied to the AND gates 292 and 294 which control memory 70 to enable these gates when a logic 1 signal is applied thereto. Similarly, the wave form 324 on line 76 is applied to AND gates 300 and 302 to enable these gates upon application of a logic 1. The state of flip-flop 73 thus permits selection of only one of the memories for storage of data.

The output signal on line 74 is also applied by way of line 75 to multiplexer 80, the multiplexer receiving output signals from memories 70 and 72 by way of lines 327 and 328 and transferring those signals to both of its output lines 329 and 330. The multiplexer is shifted by waveform 326 to receive data from memory 72 during the scan interval when data is being stored in memory 70, and to receive data from memory 70 during the scan interval when data is being stored in memory 72. The memories 70 and 72 are also connected to the multiplexer by way of "output ready" lines 331 and 332 which are status lines to indicate when data is available to be read out. If no data is available, an output signal is fed to the controller by way of multiplexer output line 330.

The transfer of data is effected by way of "shift out" input lines 333 and 334 connected to the memories 70 and 72. These lines carry strobe pulses which are supplied by the controller 78 at the clock rate by way of line 335, inverter 336, and line 337 to the multiplexer for application to whichever of the memories is selected to transfer data out. The number of strobe pulses provided by the controller during each scan cycle corresponds to the number of code bars on the label being read, and thus to the number of storage locations in the memories used for the holding of the bar code data. Each strobe pulse is fed to the memory selected for readout, and the leading edges of the pulses clock the data serially out of one storage location of the memory after another. The data from each location is transferred through the multiplexer to its output lines 329 and 330 and to corresponding flip-flops 338 and 339. The data may be transferred to both flip-flops, for redundant temporary storage, or, if the flip-flops are connected through the multiplexer to a specific memory, may be fed to one or the other, depending on which memory is selected. The leading edge of each strobe pulse advances the memory to the next storage location as it clocks the data out, so that the next memory location is read by the next following strobe pulse.

The strobe pulse on line 337 is applied to the clock inputs of flip-flops 338 and 339 by way of line 340, and the strobe pulse on line 335 is applied to gated buffers 341 and 342 by way of lines 343 and 344. These buffers are connected to the outputs of flip-flops 338 and 339, respectively, by way of lines 345 and 346 to connect the flip-flops to the controller 78. The trailing edge of the strobe pulse clocks the flip-flops 338 and 39 and enables the buffers 341 and 342 to cause the data in both flip-flops to be clocked through the buffers to the controller for processing. In this way, data is transferred from the selected memory and latched in the flip-flops while the memory is advanced, and then the data is transferred out of the flip-flops.

The scan detector 79 is illustrated in greater detail in FIG. 3C, wherein it is shown as receiving from a video output terminal 350 on camera 18 a waveform such as that illustrated in FIG. 4D. The camera circuitry thus produces a periodic video gate pulse 352 which occurs during the blanking interval at the end of each scan. This gate pulse is applied by way of line 118 to the scan detector 79, which comprises a pair of one-shot multivibrators 354 and 356 which are driven by pulse 352 to produce their output lines 87 and 88 the end of scan pulses 358 and 360 illustrated in FIGS. 4E and 4F, respectively. The one-shot multivibrators produce very narrow pulses which are applied to the logic circuits 68 and 73 to control the flow of data into the memories 70 and 72.

The pulse on line 88 from scan detector 79 is supplied to the clock input of memory select flip-flop 73 to cause that flip-flop to change states during the scan interval, i.e., between successive scans, thereby enabling the memories 70 and 72 to shift. The output on line 87 is applied to the multiplexer and logic circuit 68, and more particularly to one input of an OR gate 362 (FIG. 3A). The other input to this gate is derived from output line 364 from flip-flop 284 of the two stage shift register 282, the signal on line 364 being illustrated in FIG. 4G as waveform 366. This signal is a 1 at the margin areas of the bar code, is a 0 during the portion of the video scan where the bar code is being read, and returns to 1 at the end of the bar code, the output on line 364 being determined by the value of the output from flip-flop 283, which is supplied to the data input of flip-flop 284 by way of line 367. Flip-flops 283 and 284 are driven by the bar width counter 54 by way of line 64, thereby providing margin signals on line 364 for application to gate 362. When either the positive-going margin signal on line 364 or the end of scan pulse 358 on line 87 is applied to OR gate 362, an output is supplied to line 368 which is fed through inverter 369 for application by way of line 370 to one input of an AND gate 372 (FIG. 3B) to reset the memories 70 and 72, as will be described more fully below. The output from inverter 369 is also applied by way of line 370 and line 118 to the pixel counters 96 and 98 to signal the end of the scan interval.

Resetting of the memories 70 and 72 occurs as follows. When the bar width counter 54 counts down to 0 and produces a carry pulse on line 276, the resulting negative pulse on line 64 is fed to the clock inputs of flip-flops 283 and 284 in the two-stage shift register 282. The first clock pulse shifts the output on line 286 to a logic 1 to indicate a wide bar. At the same time, the carry pulse is applied by way of line 280 and OR gate 273 to reset counter 54 so that it again counts down. If it again counts down to 0 before being reset by the state change detector 58, a second carry pulse will be produced on line 276 which will again be applied by way of line 64 to the clock inputs of flip-flops 283 and 284. This time, however, a 1 has been applied to the data input of flip-flop 284 from line 286 by way of line 367, thereby shifting the output on line 364 to a logic 1. When this occurs it indicates that the normal width of a wide bar has been exceeded, thus indicating that the scanner is at the margin of the label, if off the label, or is reading an invalid bar. The output on line 364 thus is a margin signal which is applied through gates 362 and 369 to gate 372, which produces a memory reset signal on its output line 374 to activate AND gates 294 and 302. One of these gates has already been enabled by a memory select signal on either line 74 or 76, so that a signal is provided to the reset input of whichever of the memories 70 and 72 is then being selected. Thus, if the memory select flip-flop 73 has enabled gates 292 and 294 so that memory 70 is receiving bar code data, then AND gate 294 produces an output to reset that memory, since the data being supplied is invalid. At the same time, since memory 72 has not been selected, gates 300 and 302 are not enabled by the flip-flop 73, and the output from gate 372 does not reset that memory, thus allowing data transfer out of memory 72 to continue.

The margin signal on line 364 is also applied by way of line 380 to OR gate 382 to clear the bar counter 84. This is accomplished by an output signal from gate 382 which is applied to the clear terminals of four-bit up-down counters 384 and 386 by way of lines 388 and 390. It will be noted that the output from scan detector 79 also is applied to the clear terminals of counters 384 and 386 by way of line 88 and OR gate 382, so that the bar counter is reset to 0 at the end of each scan interval, if it is not cleared by a margin signal first.

The output of the bar counter 84 provides the second memory reset input ot OR gate 372 (FIG. 3B) by way of line 92. The bar counter 84 is preset by the controller 78 to the total number of white and black bars in a given label, the particular number being determined prior to the counting process depending upon the particular bar code being used. This number is preset into the counter 84 by way of input line 86, and the counter then proceeds to count down under control of the state change detector output pulses 264 (FIG. 4M) on lines 60 and 82. If the selected code uses 35 bars, for example the counter will be preset to 35, and upon receipt of 35 pulses the bar counter will produce an output pulse on line 392. This pulse, indicated in FIG. 4H at 394, coincides with the scanning of the last bar in the code and is applied through gate 396 and line 89 to a suitable flip-flop circuit in the controller logic 90 which responds to produce a memory inhibit signal on line 398. This signal is fed through an inverter 400 and appears on line 92 as the waveform 402 illustrated in FIG. 4I. As illustrated, the signal on line 92 is a logic 1 until the bar counter 84 complete its count, at which time it drops to a logic 0. When this signal drops to 0, the AND gates 292 and 300 in the logic circuit 68 (FIG. 3B) are disabled so that pulses on output lines 60 and 275 of the state change detector 58 can no longer reach either memory 70 or 72. Since the pulses 264 (FIG. 4M) acted as the clock pulses for the memories to shift into the memory the logic values on data input line 286, the disabling of gates 292 and 300 disables the memories and prevents insertion of additional data. Further the inhibit pulse on line 92 is applied to AND gate 372, disabling that gate and thereby disabling the reset gates 294 and 302 to prevent the memory circuits 70 and 72 from being reset. The memory reset circuits are held in their disabled condition by the bar counter 84 until the scan detector produces an end of scan pulse which clears the bar counter for the next scan interval.

It will be noted that the bar counter 84 is cleared by the margin immediately preceeding the bar code so that an accurate count is obtained and is again reset at the end of the bar count by the margin signal on line 83 or by the end of scan signal on line 126.

As previously indicated, the maximum number of picture elements, or pixels, which represent the width of a narrow bar is variable, and will depend upon the size of the label, on the distance of the camera from the container on which the label is located, and on other factors. Thus, to begin operation of the system, narrow bar counts for both black and white bars initially established by the system as a "best guess". These counts, which may be different, are supplied to the multiplexer 50 which then alternates between the black and white values to provide the correct count to the bar width counter 54, as previously described. In order to insure accuracy of the system, however, the "best guess" values are corrected to the actual values by means of pixel counters 96 and 98. Each of counters 96 and 98 includes a pair of four-bit up-down counters, the white pixel counter 96 including counter circuits 410 and 412 and the black pixel counter 98 including counter circuits 414 and 416. Counting of black and white pixels is under the control of the filtered binary video signal on line 48, which is applied by way of line 93 to the AND gates 422 and 424 which make up multiplexer 94. The signal on line 93 comprises binary 1's and 0's alternating in accordance with the black and white code bars, and these signals are applied from line 93 through an inverter 426 to one input of AND gate 422 and through line 428 to one input of AND gate 424 to alternately enable these gates. The second input to each of the AND gates is a clock signal derived from the system clock and supplied by way of input line 100.

The clock pulses on line 100 are fed through whichever of the AND gates is enabled by the binary video signal, and are applied to either the white pixel counter 96 by way of line 95 or the black pixel counter 98 by way of line 97, thereby driving the counters 410, 412 or 414, 416. The pixel counters are cleared only at the end of a scan or upon occurrence of a margin pulse on line 370, which is applied to the counters by way of line 118. Therefore, the counters 96 and 98 provide a total count for the white pixels activated during a complete scan and also provide a total count for the black pixels activated during that scan. These total counts are applied by way of lines 102 and 104 to the latching networks 107 and 108 for temporary storage, the latches being activated upon the occurrence of the output pulse 394 (FIG. 4H) from the bar counter 84 which signals the completion of the bar code scan. This signal is applied from line 92 by way of line 110 and inverter 430 to the respective latching networks by way of lines 432 and 434, the occurrence of this latching signal preventing additional counts from entering the latch networks from counters 96 and 98. At this time there appears on latch outputs 112 and 114 counts equal to the total numbers of white and black pixels, respectively, activated during the course of a single scan, and these counts are supplied to suitable comparison circuitry within the controller 78, such as logic circuitry 90, where the total number of pixels is divided by the number of bars in the label to produce new narrow bar maximum values for application to the multiplexer 50. These new values are used as the nominal width values for the black and the white bars during the next scan.

In summary, then, the camera 18 scans the bar code 16 carried on label 12 to produce an analog output signal which represents the light intensity striking each of the 1,728 picture elements in sequence in the camera scanner. A single scan requires 1,728 clock pulses, and a single scan interval thus includes that number of counts. As illustrated in FIG. 4B, however, a part of the scan may cover some of the container surface adjacent the label and will cover margin areas adjacent the code bars to produce margin signals which preceed and follow the data of interest.

A threshold detector tracks the video signal from the camera to automatically vary the threshold in accordance with ambient light, background color, variations in lenses, and the like, so that when the data representing the bar code is reached, the threshold is at the D.C. level of the background and accurate readings can be obtained for the positive and negative signals representing white and black bars. The threshold value is compared to the analog output signal in a comparator, and an accurate binary video signal is obtained. This binary signal is fed through a digital filter which eliminates single pixel aberrations and the resultant filtered signal is applied by way of a change of state detector and suitable logic gates to control the application of data from one or the other of a pair of memories. Two memories are provided so that while one is receiving data relating the the current video scan, data relating to the next preceeding video scan, already stored in the other memory, can be transferred to suitable storage and data handling circuits.

The data supplied to the memories is in the form of a single logic 0 or logic 1 signal occurring during each white or black bar read-out. Since it is known that white and black bars alternate in the bar code, it is not necessary to store in the memory data representing the black and white pulses; the code always starts with a black bar, and thus as soon as the code read-out begins after the margin reset occurs, it is known that the first interval will represent a black bar, the next interval will represent a white bar, and so on. The only information lacking, therefore, relates to the width of the bar, and this is supplied by the bar width counter which produces an output only when a wide bar is encountered. When a wide black or white bar is encountered, therefore, an output data pulse is supplied to the selected memory. Accordingly, the memory stores a series of 0 or 1 logic states, the 0 states representing black or white narrow bars, and the 1 states representing the occurrence of a wide bar.

To prevent errors, the bar width counter is recycled so that if the measured bar is too wide, a second pulse output resets the memory. Such a reset indicates that the camera is scanning a margin or that the bar code is invalid.

As a further protection against error, a bar number counter is also provided and produces an output pulse when the preselected number of black and white bars have been counted. This counter is preset to the known total number of bars on a label and produces an inhibit signal at the end of the preselected count to prevent the insertion of additional data to the memories. The bar number counter is reset by the margin indicating pulses as well as by pulses indicating the end of a scan interval.

Because of variations in the apparent width of the bars on a label, due to variations in the distance between the camera and the label being scanned, the bar width counter must be adjusted to a particular camera setup. This is accomplished by preliminarily establishing a maximum value for bar width, and then updating that approximation by means of an actual count. This actual count is obtained by means of a totaling counter which is operated by the system clock to count the total number of white and black picture elements, or pixels, in a label code. These pixel counters are reset by the margin signal preceeding the code, and then proceed to count the total number of pixels, with the count being fed directly to corresponding latch circuits. As soon as the bar number counter indicates that all of the bars have been counted, the latch circuits are activated to hold the count, and the resulting sums are then divided by the known number of bars in the label to provide average maximum values for the narrow bars, which values are then automatically substituted for the initial approximations for use in subsequent readings.

Although the present invention has been directed in terms of a preferred embodiment thereof, it will be apparent to those of skill in the art that numerous variations and modifications can be made without departing from the true spirit and scope thereof as defined in the following claims.

What is claimed is:

1. An optical reader system for bar codes having narrow and wide code bars of first and second contrasting optical characteristics, said system comprising:

scanner means for optically scanning a bar code and for producting an analog signal corresponding to the bar code image, said scanner means including a plurality of picture elements each responsive to that image of said bar code which impinges thereon to produce a corresponding pixel output signal, and means for sequentially scanning said pixel output signals to produce said analog signal; dynamic threshold detector means responsive to the amplitude of said analog signal to produce a D.C. threshold signal equal to the average value of said analog signal; comparator means responsive to said D.C. threshold signal and to said analog signal;

for converting said analog signal to a corresponding binary signal;

digital filter means for eliminating selected narrow-width binary signals caused by aberrations in said analog video signal to produce a filtered binary signal;

means responsive to changes in the state of said filtered binary signal for producing a train of bar width signals, each bar width signal corresponding to, and providing a measure of, the width of a corresponding one of successive code bars, said train of bar width signals thereby providing an individual measure of the width of each bar of said bar code;

first logic means responsive to successive bar width signals for producing digital data signals corresponding to the code represented by said bar code;

digital memory means for serially receiving and storing said digital data signals; and second logic means for selectively inhibiting and clearing said memory means, whereby data signals relating to only a single bar code at a time entered in said memory means.

2. The system of claim 1, wherein said bar code comprises a series of width-coded bars of alternating optical characteristics, and wherein the image of each of said code bars impinges on at least two adjacent picture elements, whereby said analog video signal comprises a train of pulses each at least two pixels wide.

3. The system of claim 2, wherein said binary signal comprises a series of pulses having a first amplitude corresponding to code bars of a first optical characteristic and having a second amplitude corresponding to code bars of a second optical characteristic, each of said pulses having a width corresponding to the number of pixels impinged by the image of the corresponding code bar.

4. The system of claim 2, wherein said filter means includes means for masking predetermined pixel variations in said binary video signal.

5. The system of claim 4, wherein said filter means comprises a shift register having serial and parallel input means for receiving said binary signal, means for shifting said binary signal through said shift register a single pixel at a time to provide a delayed output, and means responsive to a preselected pixel variation to change the shift register from a serial input mode to a parallel input mode to prevent said pixel variation from reaching said shift register output.

6. The system of claim 3, where in said means for producing a train of bar width signals comprises:

a state change detector connected to the output of said filter means for producing a state change pulse each time said filtered binary signal changes from one binary state to another; and a bar width counter responsive to each state change pulse to produce said train of bar width signals.

7. The system of claim 6, wherein said means for producing a train of bar width signals further comprises:

means for supplying to said bar width counter predetermined counts equal to the maximum number of pixels produced by a narrow code bar of each of said contrasting optical characteristics, said bar width counter stepping down one count for each pixel scanned and producing a first bar width pulse at the end of a count; and means responsive to said state change pulse or to a bar width pulse from said bar width counter for resetting said bar width counter, said bar width counter being reset by said state change pulse before a bar width pulse is produced whenever a narrow code bar is being scanned, and said bar width counter being reset by said first bar width pulse and thereafter by said state change pulse whenever a wide code bar is being scanned.

8. The system of claim 7, wherein said first logic means comprises multiplexer means connected to said bar width counter and to said state change detector, said multiplexer means being driven by said bar width pulses and said state change pulses to produce digital data signals comprising a first digital output level for each narrow code bar scanned and a second digital output level for each wide code bar scanned.

9. The system of claim 8, wherein said digital memory means is connected directly to said multiplexer means to receive and store said digital data signals.

10. The system claim 6, further including:

bar counter means for producing a bar count pulse when a predetermined number of code bars have been scanned; and means responsive to a bar count pulse to activate said second logic means to inhibit said memory means.

11. The system of claim 10, further including means for presetting said bar counter to the number of bars in the bar code to be read, said bar counter means being driven by said state change pulses to count the number of bars scanned, said bar counter producing said bar count pulse when the number of state change pulses received equals the preset number of bars.

12. The system of claim 6, wherein said means for producing a train of bar width signals comprises:

means for supplying to said bar width counter predetermined counts equal to the maximum number of pixels produced by a narrow code bar of each of said contrasting optical characteristics; and means for updating said predetermined bar width counts.

13. The system of claim 12, wherein said means for updating comprises:

first and second pixel counters for counting the total number of pixels representing the total number of code bars of each of said first and second optical characteristics; and means for deriving from said pixel counters average narrow bar pixel counts.

14. The system of claim 1, wherein said digital memory means comprises first and second serial memory circuits connected to receive said digital data signals, and wherein said second logic means comprises memory selector means for selecting only one of said memory circuits at a time for reception and storage of said digital data signals.

15. The system of claim 14, said second logic means further including means for transferring stored data out of said memories, said memory selector means including means for selecting only one of said memory circuits at a time for transferral of data, said memory selector means being operative to select one memory circuit for reception and storage of data while selecting the other memory circuit for transferral of data.

16. The system of claim 15, wherein said first logic means includes means responsive to said bar width signals to detect an invalid code bar, and wherein said second logic means includes means responsive to an invalid code bar to reset the memory circuit selected for reception and storage of data.

17. The system of claim 16, further including bar counter means for producing a bar count pulse when a predetermined number of code bars have been scanned; and
means responsive to a bar count pulse to activate said second logic means to inhibit the memory circuit selected for reception and storage of data to prevent the entry of additional data.

18. The system of claim 17, further including scan detector means for detecting the end of a scan of a bar code and for producing an end of scan pulse, said memory selector means being responsive to an end of scan pulse for shifting said memory circuits.

19. The system of claim 14, wherein said means for producing a train of bar width signals includes a state change detector responsive to changes in the state of said filtered binary signal to produce a state change pulse each time said filtered binary signal changes from one binary state to another, and wherein said second logic means includes means for applying said state change pulses to said first and second memories to clock the memory selected for reception and storage of data, so that said selected memory is advanced for each code bar, and receives corresponding bar width data for storage, so that the selected memory receives and serially stores binary data representing the width of each of the code bars in said bar code.

20. A method of reading bar codes and storing binary data pulses corresponding thereto, comprising:
optically imaging a bar code having a plurality of narrow and wide code bars of alternate first and second contrasting optical characteristics on a linear array of picture elements in a scanning camera;
producing an analog signal corresponding to the bar code image by sequentially scanning said picture elements, said analog signal being comprised of a series of pixels each corresponding to that portion of the image of said bar code which impinges on a respective picture element;
producing a D. C. threshold signal equal to the average value of said analon signal;
comparing said analog signal to said threshold signal to produce a binary signal having a first level for code bars of a first optical characteristic and having a second level for code bars of a second optical characteristic;
filtering said binary signal to eliminate single pixel aberrations and to produce a filtered binary signal having said first and second levels;
detecting changes in said binary signal levels and producing corresponding state change pulses to indicate the beginning and end of each of said first and second binary levels;
driving a serial memory at a clock rate determined by said state change pulses to advance said memory one step for each code bar;
producing a bar width signal for each code bar, said bar width signal having a first value for narrow bars and a second value for wide bars; and
supplying said bar width signals in sequence to said serial memory in synchronization with the stepping of said memory by said state change pulses, whereby said bar width signals are stored in said serial memory to provide a serial record of the width of each code bar in said bar code.

21. The method of claim 20, wherein the step of producing a bar width signal comprises:
predetermining the number of pixels nominally in a narrow code bar;
counting the number of pixels in each code bar; and
producing a bar width signal of said first value until the number of pixels being counted exceeds the predetermined number and thereafter producing a bar width signal of said second value.

22. The method of claim 21, further including the steps of:
supplying said bar width signals to a pair of serial memories;
selecting one of said memories for receiving and storing said bar width signals for a first bar code scan;
selecting the other of said memories for transferring stored data to data handling equipment during said first bar code scan; and
reversing the selection of said memories for a second bar code scan.

23. The method of claim 22, further including inhibiting said memories at the end of each bar code scan to prevent entry of spurious data.

24. The method of claim 23, further including the steps of:
producing a clearing signal upon scanning an invalid code bar; and
clearing the memory selected for receipt and storage of bar width signals upon occurrence of said clearing signal.

25. An optical reader system for bar codes having narrow and wide code bars of alternate first and second contrasting optical characteristics, said system comprising:
means for optically scanning a bar code and for producing an analog video signal corresponding to the image of said bar code;
dynamic threshold means for converting said analog video signal to a corresponding binary video signal;
digital filter means for eliminating binary signals of preselected widths caused by aberrations in said binary video signal to produce a filtered binary signal representing said bar code;
first detector means responsive to the binary state of said filtered binary signal for producing a train of bar width signals representing the widths of successive code bars;
first counter means responsive to said first detector means for producing outputs corresponding to the counts reached during the scanning of successive code bars, said outputs corresponding to the widths of said code bars;

second counter means responsive to said first detector means to determine the total number of code bars in the scanned bar code; and logic means responsive to said first and second counter means for storing said first counter outputs.

26. The optical reader system of claim 25, wherein said means for scanning comprises a line scanner having a plurality of picture elements each responsive to that portion of the image of said bar code which impinges thereon to produce a corresponding electrical output signal, or pixel, and means for sequentially scanning said pixels to produce an analog video signal consisting of a series of pixels.

27. The optical reader system of claim 26, wherein said bar code comprises a series of width-coded bars of alternating optical characteristics, and wherein the image of each of said code bars impinges on at least two adjacent picture elements, whereby said analog video signal comprises a train of pulses each at least two pixels wide.

28. The optical reader system of claim 27, wherein said filter means includes means for masking predetermined pixel variations in said binary video signal.

29. The optical reader system of claim 25, wherein said first detector means produces a state change pulse each time said filtered binary signal changes from one binary state to another, successive state change pulses comprising said train of bar width signals.

30. The optical reader system of claim 29, wherein said first counter means is responsive to a first state change pulse to start counting and to produce an output corresponding to the accumulated count upon receipt of a second state change pulse, said accumulated count and the corresponding output being dependent on the time between successive state change pulses in said train of bar width signals.

31. The optical reader system of claim 30, wherein said first counter is clock-driven, and wherein each said state change pulse resets said first counter.

32. The optical reader system of claim 29, wherein said logic means is further responsive to a bar count signal from said second counter means, whereby said first counter outputs are stored after said first counter produces an output for each of the code bars in said bar code.

33. The optical reader system of claim 32, wherein said second counter means counts said state change pulses to determine the total number of code bars scanned.

34. The optical reader system of claim 33, further including means for presetting said second counter to a value corresponding to the number of code bars in a bar code image to be scanned, said second counter producing said bar count signal when the number of state change pulses equals said preset value.

35. The optical reader system of claim 34, wherein said first counter means is responsive to a first state change pulse to start counting, said first counter means producing an output corresponding to the accumulated count upon receipt of a second state change pulse, said accumulated count and the corresponding output being dependent on the time between successive state change pulses in said train of bar width signals.

* * * * *

UNITED STATES PATENT AND TRADEMARK OFFICE
CERTIFICATE OF CORRECTION

PATENT NO. : 4,323,772
DATED : April 6, 1982
INVENTOR(S) : RICHARD F. SERGE

It is certified that error appears in the above-identified patent and that said Letters Patent are hereby corrected as shown below:

Col. 21, line 20, cancel the semicolon (";");

line 25, cancel "video";

line 42, after "time" insert --are--.

Col. 21, line 60, cancel "video".

Col. 22, line 1, change "3" to --2--.

Col. 23, line 60, change "analon" to --analog--.

Signed and Sealed this

Third Day of August 1982

[SEAL]

Attest:

GERALD J. MOSSINGHOFF

*Attesting Officer*   Commissioner of Patents and Trademarks